Patented July 22, 1941

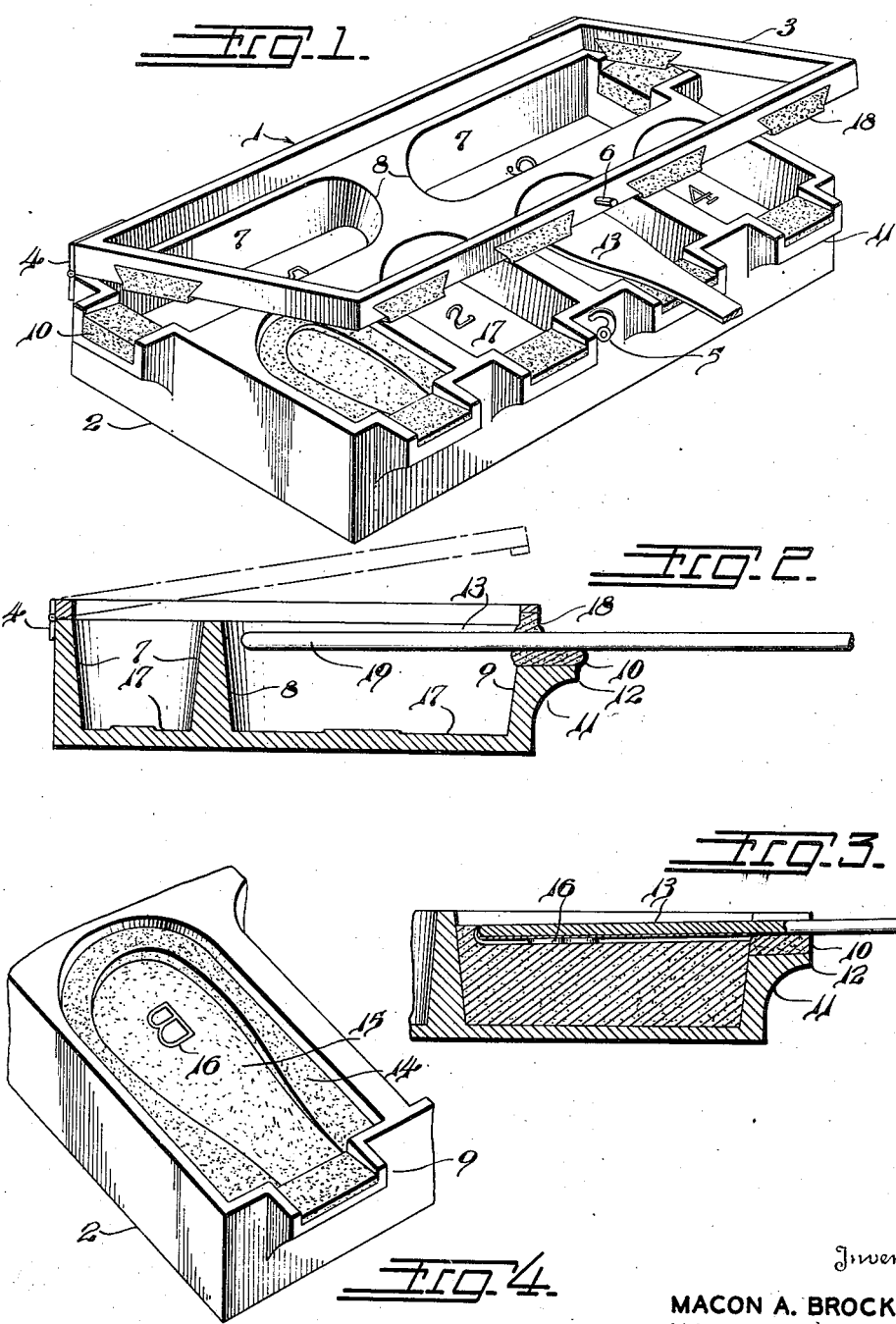

2,250,353

UNITED STATES PATENT OFFICE 2,250,353

TRANSFER MOLD AND PROCESS

Macon A. Brock and Harlin W. Winkle, Rome, Ga.

Application April 15, 1939, Serial No. 268,044

4 Claims. (Cl. 41—33)

This invention relates to engraving transfer methods and means for executing such methods. It is an object of the invention to provide an improved method of transferring such an engraved design from an engraved article to a similar article selected to receive the engraving.

Another object is to provide an improved transfer mold for carrying such method into effect.

A further object is to provide a transfer mold arranged to facilitate the transfer of engraved designs from a number of articles at the same time.

Still another object of the invention is to provide a mold insert constituting a permanent record of the design, which insert may be filed away for future use in transferring the design.

Another object of our invention is to provide an apparatus and method whereby the engraved design on one article may be transferred to the same location on a similar article with speed and accuracy and is characterized by a maximum of definition in the transferred design.

According to our invention we provide a mold in which the engraved article is immobilized and then surround the article with a synthetic rubber composition in the fluid state which upon solidifying, reproduces the outline of the article. For further description of the method employed and the apparatus particularly suited to carrying out such method, reference will now be made to the drawing in which Figure 1 is a perspective view of our transfer mold showing a mold insert in position and also showing an article in position to be immobilized in place, Figure 2 is a view partly in section and partly in elevation showing the article in position, Figure 3 is a partial sectional view similar to Figure 2 but showing the mold insert in place, and Figure 4 is a perspective view of a part of the mold showing the outline of the engraving transferred to the mold insert.

Referring now to the drawing and more particularly to Figure 1 thereof, there is shown a transfer mold generally indicated at 1 comprising a lower body 2 and a rectangular upper frame member 3 hinged thereto at 4 and adapted to be moved from the open position of Figure 1 to the closed position of Figure 2 and to be secured in such closed position by means of the pivotal latch 5 on body 2 cooperating with the pin 6 on frame member 3. The lower body 2 which may be made of metal, or a rigid plastic, etc., is formed with a plurality of generally rectangular recesses, one end of which is in communication with the outer wall of said body 2 while the opposite ends of said recesses extend inwardly of said wall and are of rounded configuration. The lateral walls 7, rear wall 8, and front wall 9 of each recess are inclined outwardly as shown to facilitate removal of the insert 14 (Fig. 3) from the body 2. The recesses are provided with raised numerals from 1 to 6 on the bottom recess walls 17 to identify the mold inserts. If desired, corresponding numerals (not shown) may be formed on the outer wall of said body adjacent each recess so that the number of the recess may be ascertained even when the insert is in place within the recess.

Where the recesses communicate with the outer wall of the body 2, said wall is provided with integrally formed projections 11 defining passages in which are snugly positioned the resilient blocks 10 which are of parallelogram cross-section (Figs. 2 and 3). The bottom wall 12 of each passage is inclined downwardly toward the rounded end of each recess as shown in Figs. 2 and 3 for a purpose later to be described. The upper frame member which may be of metal, or similar rigid material is formed in its lower wall with dove-tailed notches in which are received resilient blocks 18 mating with the blocks 10 of the body 2 when the frame member is in closed position. The resilient blocks 10 and 18 may be of any suitable material such as cork, rubber, etc.

The transfer mold is adopted particularly to facilitate the transfer of an engraving design from the handle of an engraved knife, fork or spoon to the corresponding part of a similar unengraved article. The method found to be most advantageous will now be detailed.

The handle of a spoon, for example is placed in one of the recesses of the body 2 as shown at 13 in Figure 1, the surface to be engraved being lowermost. The upper frame 3 is then lowered and secured in place by latch 5 and pin 6. The spoon will now be firmly gripped and immobilized in place between the blocks 10 and 18 with its handle to be engraved inclined downwardly into the recess as shown in Figure 2.

The liquid for forming the mold insert 14 is then poured into the recess to a level just sufficient to cover the end edge of the spoon handle and to come well up on the side edges of the handle as shown by the dotted line 17 in Fig. 2. Thus, the inclination of surface 12 with respect to the surface of the handle is such as to insure a substantial covering of the edges by the liquid material as well as that of the surface to be engraved.

The material which we have found most satisfactory for use as a mold insert for surrounding the spoon handle is a synthetic rubber product which is a resilient, close-textured solid at ordinary room temperature but when heated changes to a liquid state and at a temperature of around 300° F. has about the same consistency as syrup. "Korogel," of the group of polymerized vinyl chlorides, the composition of which is generally described in Pat. #1,929,453 and Trade-Mark #337,287 has been found to give excellent results. As the liquid cools, it solidifies and after about an hour's time the mold may be opened and the spoon handle removed from the formed insert which now carries an exact outline of the removed handle. At this time it will be noticed that the upper surface of the mold insert is covered with a cohesive, oily film resulting from the solidification process. This oily film plays an important part in the actual transferring of the design.

After the spoon handle is removed from the mold it may be engraved as desired; the depressions of the engraving are then filled with a carmine dye of the eosine type in powdered form, the surplus being carefully removed from the surface of the spoon. Powdered crayon or chalk has been employed in place of the dye but was found to be less satisfactory. The spoon handle is next placed in the depression formed in the mold insert, the engraved portion of the handle being firmly pressed into the oily film on the rubber-like insert. Upon removal of the spoon a distinct delineation of the design will be left on the surface of the insert as shown in Fig. 4.

A spoon similar to the engraved one is now taken and the surface thereof to receive the transferred design is coated with a thin layer of wax. This wax is preferably of a somewhat stiff and sticky nature such as is commonly employed in the engraver's art. The spoon is now pressed waxed side downwards into the handle contour in the mold insert and into firm contact with the raised letter outline (Fig. 3). When the spoon handle is removed from the insert, a clear outline of the design will adhere to the wax layer serving as a guide for the engraving which is done in the customary manner. The spoon to be engraved will make a close and accurate fit with the contour of the mold if care is taken to remove any wax that may be on the boundary edge of the handle. Additional transfers may be made by waxing each spoon handle to receive the engraving in the same manner as above described and continuing until the outline of the design in the mold insert becomes too indistinct to give a satisfactory transfer design in the wax layer. At this time the engraving of the original spoon may be refilled with the dye and pressed into the mold as described at first and the transferring of the design continued indefinitely. Obviously, it is not necessary that the spoon to be engraved originally should be clamped in the mold to give the spoon handle shape required in the insert, since any spoon similar in shape but without engraving may be employed.

From the foregoing it will be noted that the upper frame 3 is employed only in the initial clamping of the article in the mold, the other operations being manual. A hinge having a removable pin may be employed at 4 so that the upper frame 3 may be removed from the body 2 after the poured insert has solidified, thus facilitating the subsequent transferring operations. The provision of a plurality of recesses in the mold permits the formation of several inserts at the same time. It will be noted also that the passages formed by the projections 11 in the recesses adjacent the hinge are deeper than those provided at the front of the mold body. This greater depth as well as the increased length of these recesses adapts the same particularly for use with cutlery of increased handle thickness such as knives. Since the blocks 10 as well as the blocks 18 are readily removable and replaceable with other blocks of greater or less thickness, it is apparent that cutlery of various thicknesses, lengths and shapes may readily be clamped in place and the mold inserts thereof poured.

A further advantage of our improved method and apparatus is that discarded mold inserts can be remelted and used to pour new inserts; also inserts that have served their purpose for transferring a design at any one time may be put away for future use with the assurance that the identical design may be transferred expeditiously to new articles of the same kind purchased later without the inconvenience to the household caused by return of silverware, for example, for transferring of the design as formerly.

The provision for numbering of the inserts insures their return to the recesses in which they were poured when future transfers are to be made.

Although dyes other than those of the eosine type may be found suitable for transferring the design, we prefer to use a dye that is not readily soluble in oil to add permanence and clarity to the design outline on the surface of the insert.

Due to the fact that the synthetic rubber material employed has practically a zero coefficient of expansion upon cooling from the liquid state to the solid state, the mold insert outline of the positioned article will accurately follow the contour of the article and remain in this exact outline indefinitely since no shrinkage with age occurs. Thus, future transfers are as accurate both as to orientation on the article and as to definition as the originals. Cutlery having curved handles as well as straight handles may be handled by our method and apparatus with dispatch, producing excellent detail in the transferred patterns, since in the impressing of the powdered dye layer from the mold insert upon the wax layer of the article to receive the design, the mold insert is not deformed or distorted in any way as its shape conforms exactly to that of the article to receive the design; hence no distortion of the design on the surface of the insert takes place. By providing recesses of long and narrow shape having walls spaced only a short distance from the outer margin of the article as shown (Fig. 4), transverse stress and strain within the insert material due to pressure in the transferring operation with possible resulting deformation of the design on the surface of the insert is minimized.

While the particular synthetic rubber previously mentioned is best adapted to use as an insert material due to its properties as described, our experiments have shown that other synthetic rubber materials having the properties of low melting point to permit pouring at about 300° F., quick solidification to a stiff, resilient jel at ordinary room temperature, substantially zero coefficient of expansion upon solidifying, and being reversible in state from a solid to a liquid, but lacking the oily surface characteristic, may be employed by coating the surface of the mold insert with oil or similar adhesive or sticky material to retain the powdery outline from the engraved article. The polymerized vinyl chloride is particularly suited as a mold insert material since no oily film is needed to be added to its surface after solidification.

A further practical advantage of this synthetic rubber found most successful is in its rapid increase in viscosity and internal cohesion upon cooling. For this reason it quickly takes the shape of the mold and article and "sets"; also there is no extrusion of the liquid along the narrow spaces defined by the sides of the article and the walls of the passage formed by the projections 11. We have found that in the case of articles having unusual thickness, the lower block 10 of the mold body may be removed and the liquid poured without undesirable extrusion resulting even in this case.

Thus it will be seen that we have provided a novel method and apparatus for facilitating the transfer of an engraved design from one article to another. Essentially the latter comprises a mold body provided with one or more individual recesses for the separate articles, the recesses and the outer wall of the body being connected by opening passages or slots. By supporting at a suitable inclination the end of the article of silverware, for example, remote from the recess into which the other end of the article extends, it may be immobilized sufficiently with respect to the mold body to produce satisfactory mold inserts without use of the upper frame member 3 or blocks 10 and 18.

Therefore, we do not wish to limit our invention to the specific embodiment illustrated but only as defined in the following claims.

We claim:

1. The method of transferring engraved designs comprising, immobilizing the article to be engraved, surrounding the portion to be engraved with a heated liquid that solidifies to a firm resilient jel at ordinary temperature, allowing said liquid to cool to the solid form, removing said article from the mold insert formed by said solid, producing an outline of the design upon the surface of the mold insert by pressing into said mold insert and against said surface in the former position of said article an engraved article having a powdery pigment filling the engraved portion thereof, removing said article from said mold insert, coating said portion to be engraved with a film of wax, pressing said first article including said portion into its former position in the mold insert with said wax film in contact with said powdery pigment outline, and removing said article from said mold insert for engraving according to the powdery outline adhering to said wax film.

2. The method of transferring engraved designs comprising, immobilizing the article to be engraved, surrounding the portion to be engraved with a heated liquid that solidifies to a firm resilient jel at ordinary temperature, allowing said liquid to cool to the solid form, removing said article from the mold insert formed by said solid, coating the surface of said mold insert with an adhesive film, producing an outline of the design upon the surface of the mold insert by pressing into said mold insert and against said adhesive surface in the former position of said article an engraved article having a powdery pigment filling the engraved portion thereof, removing said article from said mold insert, coating said portion to be engraved with a film of wax, pressing said first article including said portion into its former position in the mold insert with said wax film in contact with said powdery pigment outline, and removing said article from said mold insert for engraving according to the powdery outline adhering to said wax film.

3. The method of transferring engraved designs from one article of silverware to another comprising, immobilizing said article with the portion to be engraved extending downwardly into the recess of a transfer mold, filling said recess to the upper level of said article with a heated liquid that solidifies to a firm, resilient jel at ordinary temperature, allowing said liquid to cool to the solid form, removing said article from the mold insert formed by said solid, producing an outline of the design upon the surface of the mold insert by pressing into said mold insert and against said surface in the former position of said article, an engraved article having a powdery dye of the eosine type filling the engraved portion thereof, removing said article from said mold insert, coating said portion to be engraved with a film of wax, pressing said first article including said portion into its former position in the mold insert with said wax film in contact with said powdery dye outline, and removing said article from said mold insert for engraving according to the powdery outline adhering to said wax film.

4. In the process of transferring engraved designs from one article to another, the method of making a transfer mold insert comprising the steps of immobilizing said article in a mold, filling said mold to the level of said article with a heated, liquid synthetic rubber which solidifies upon cooling, cooling said liquid to form a mold insert about said article, removing said article from said mold insert, and producing an outline of the design upon the surface of said mold insert by pressing into said mold insert and against said surface in the former position of said article an engraved article having a powdery pigment filling the engraved portion thereof.

MACON A. BROCK.
HARLIN W. WINKLE.